United States Patent [19]

Suh

[11] 3,714,193
[45] Jan. 30, 1973

[54] DERIVATIVES OF 1,2,3,4-TETRAHYDRO-5H-BENZOTHIENO[2,3-C]AZEPINES

[75] Inventor: John T. Suh, Mequon, Wis.

[73] Assignee: Colgate-Palmolive Company, New York, N.Y.

[22] Filed: Sept. 23, 1970

[21] Appl. No.: 74,827

Related U.S. Application Data

[63] Continuation-in-part of Ser. No. 876,600, Nov. 13, 1969, Pat. No. 3,561,068, which is a continuation-in-part of Ser. No. 705,909, Feb. 16, 1968, Pat. No. 3,520,895, which is a continuation-in-part of Ser. No. 621,475, March 8, 1967, abandoned.

[52] U.S. Cl. ......260/330.5, 260/247.1, 260/268 TR, 260/293.57, 260/294.8 B, 260/326.3, 260/326.5 S, 260/325.5 A, 260/326.81, 260/326.9, 424/248, 424/250, 424/263, 424/267, 424/274, 424/275

[51] Int. Cl. ......................A61k 27/00, C07d 63/22
[58] Field of Search....................................260/330.5

[56] References Cited

UNITED STATES PATENTS 3,429,294    1/1970    Suh ......................................260/240

Primary Examiner—Henry R. Jiles
Assistant Examiner—Cecilia M. S. Jaisle
Attorney—T. F. Kryshak and M. L. Youngs

[57] ABSTRACT

The compounds are derivatives of 1,2,3,4-tetrahydro-5H-benzothieno[2,3-C]azepines useful as antihypertensive and tranquilizing agents. A compound disclosed is 1-ethyl-1,2,3,4-tetrahydrobenzothieno[2,3-C]azepine.

4 Claims, No Drawings

DERIVATIVES OF 1,2,3,4-TETRAHYDRO-5H-BENZOTHIENO[2,3-C]AZEPINES

RELATED CASES

The present application is a continuation-in-part of my copending application Ser. No. 876,600 filed Nov. 13, 1969, now U.S. Pat. No. 3,651,068 which is a continuation-in-part of my Ser. No. 705,909 filed Feb. 16, 1968, now U.S. Pat. No. 3,520,895, which is a continuation-in-part of my earlier application Ser. No. 621,475 filed Mar. 8, 1967, now abandoned.

DETAILED DESCRIPTION

The compounds of the present invention have the following formula:

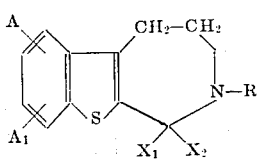

wherein A and $A_1$ are selected from hydrogen, hydroxy, nitro, lower alkyl groups of one to four carbon atoms such as methyl, ethyl or isopropyl, lower alkoxy groups such as methoxy, ethoxy and propoxy, halo such as bromo, chloro and fluoro and trifluoromethyl, R is a group selected from hydrogen, a lower alkyl of one to four carbon atoms, an aralkyl of seven to 11 carbon atoms, such as benzyl, phenethyl and phenylisopropyl, and including halo and lower alkoxy substituted phenyl-lower alkyls such as o-chlorobenzyl and p-methoxybenzyl, $(CH_2)_n$—OH in which $n$ is two to six, and B-Am in which B is an alkylene of two to six carbon atoms and Am is selected from a.

in which $R_1$ and $R_2$ may be the same or different groups selected from hydrogen, lower alkyl of one to four carbon atoms, lower alkyl-tertiaryamino such as diethylaminoethyl, hydroxy-lower alkyl such as hydroxyethyl, a lower alkenyl of three to six carbon atoms such as allyl and hexenyl, phenyl, nuclear substituted phenyl, particularly a halophenyl such as o-chlorophenyl and an alkoxyphenyl such as p-methoxyphenyl, cycloalkyl groups, particularly those containing three to seven carbon atoms and including cyclohexyl and cyclopentyl, cycloalkyl-lower alkyl groups, particularly those in which the cycloalkyl contains three to seven carbon atoms such as cyclohexyl-methyl and cyclopentyl-ethyl, b. groups in which

represents an amino group such as morpholino, pyrrolidino, piperidino, N-lower alkyl piperazino groups such as N-methyl-piperazino, N-(phenyl-lower alkyl)-piperazino groups such as N-benzylpiperazino and 4-(alpha-methylphenethyl)-piper-azino and N-(hydroxy-lower alkyl)-piperazino groups such as 4-(beta-hydroxyethyl)-piperazino, and c. Am is a cyclic amine group bonded through a nuclear carbon to B, including such groups as N-lower alkyl-2,3 or 4-piperidyls such as N-methyl-3-piperidyl, N-ethyl-4-piperidyl, N-ethyl-2-piperidyl and N-isopropyl-3-piperidyl, N-(di-lower alkyl amino-lower alkyl)-2,3 or 4-piperidyls such as N-(beta-dimethylaminopropyl)-4-piperidyl, N-(beta-diethylaminoethyl)-3-piperidyl and N-(beta-dimethylaminopropyl)-2piperidyl, N-phenyl-lower alkyl-3 or 4-piperidyls such as N-benzyl-3-piperidyl, N-phenylethyl-4-piperidyl and N-phenylpropyl-3-piperidyl, 2-piperidyl, 3-piperidyl and 4-piperidyl, 2-pyrrolidyl, 3-pyrrolidyl, N-lower alkyl-2 or 3-pyrrolidyls such as N-methyl-2-pyrrolidyl, N-ethyl-3-pyrrolidyl, N-propyl-4-pyrrolidyl, and N-phenyl-lower alkyl-2 or 3-pyrrolidyls such as N-benzyl-2-pyrrolidyl and N-phenyl-ethyl-3-pyrrolidyl, $X_1$ is hydrogen or lower alkyl and $X_2$ is hydrogen, a lower alkyl of one to four carbon atoms, phenyl, including a nuclear substituted phenyl, particularly a halophenyl such as o-chlorophenyl, or an alkoxyphenyl such as p-methoxyphenyl, aralkyl of seven to 11 carbon atoms such as benzyl, phenethyl and phenylisopropyl, and including nuclear substituted aralkyls, particularly halo and lower alkoxy substituted phenyl-lower alkyls, such as o-chlorobenzyl and dimethoxybenzyl, a heterocyclic such as pyridyl, piperidyl, furyl, thienyl, pyrryl and pyrrolidyl or B-Am.

The basic starting materials employed in the preparation of the compounds of the present invention are β-(3-thianaph-thenyl)propylamines of the formula

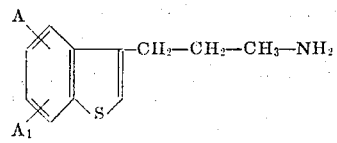

These amines may be prepared in the manner described in the literature for the corresponding ethylamines (Herz J.S.C.S. 72, p. 4999 (1950)).

The starting materials may also be prepared by treating the corresponding acid with thionyl chloride followed by treatment with sodium azide and acid hydrolysis. The process may be illustrated as follows:

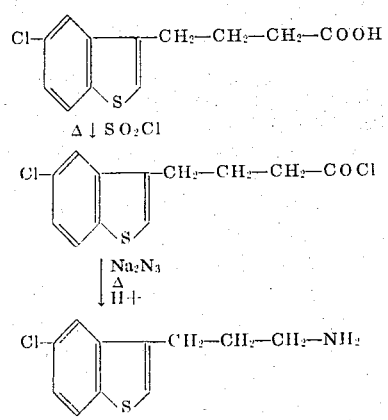

Representative of the amines which may be employed are the following:
γ-(3-thianaphthenyl)propylamine,
γ-(5-chloro-3-thianaphthenyl)propylamine, γ-(5-fluoro-3-thianaphthenyl)propylamine,
γ-(5-hydroxy-3-thianaphthenyl)propylamine,
γ-(6-trifluoromethyl-3-thianaphthenyl)propylamine,
γ-(5-trifluoromethyl-3-thianaphthenyl)propylamine,
γ-(7-methoxy-3-thianaphthenyl)propylamine, and
γ-(4-bromo-3-thianaphthenyl)propylamine.

The compounds of the present invention which are represented by the formula

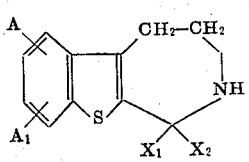

wherein $X_1$ is hydrogen may be prepared by treating a γ-(3-thianaphthenyl)propylamine with a suitable aldehyde in a concentrated liquid organic acid such as glacial acetic acid.

The above described process may be diagrammed as follows:

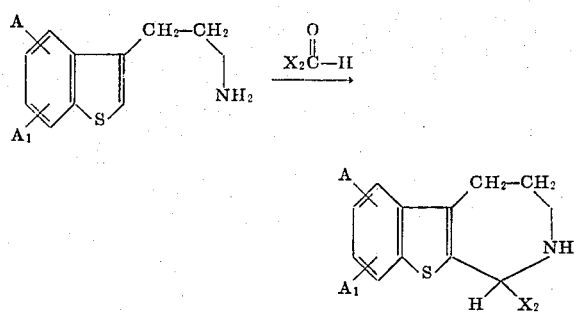

wherein A and $A_1$ are as described and do not interfere with or partake in the reaction.

Representative of the aldehydes which may be employed in the described process are the following:
pyridine-4-carboxaldehyde,
pyridine-2-carboxaldehyde,
benzaldehyde,
p-methoxybenzaldehyde,
dimethylaminobenzaldehyde,
2-furaldehyde,
2-pyrrolecarboxaldehyde,
3-pyrrolecarboxaldehyde,
2-thiophenecarboxaldehyde, and
3-thiophenecarboxaldehyde.

Representative of the compounds which may be prepared by the described process are the following:
1-phenyl-1,2,3,4-tetrahydro-5H-benzothieno[2,3-C]azepine,
1-ethyl-1,2,3,4-tetrahydro-5H-benzothieno[2,3-C]azepine,
1-(p-chlorophenyl)-1,2,3,4-tetrahydro-5 H-benzothieno[2,3-C]azepine,
1-(p-trifluoromethylphenyl)-1,2,3,4-tetrahydro-5H-benzothieno[2,3-C]azepine,
1-(2'-pyridyl)-1,2,3,4-tetrahydro-5H-benzothieno[2,3-C]azepine,
1-(p-methoxyphenyl)-1,2,3,4-tetrahydrobenzothieno[2,3-C]azepine,
1-(2'-pyridyl)-7-methoxy-1,2,3,4-tetrahydrobenzothieno[2,3-C]azepine,
1-(2'-furyl)-5-bromo-1,2,3,4-tetrahydrobenzothieno[2,3-C]azepine,
1-(m-dimethylaminophenyl)-6-trifluoromethyl-1,2,3,4-tetrahydrobenzothieno[2,3-C]azepine,
1-(2'-thienyl)-7-methoxy-1,2,3,4-tetrahydrobenzothieno[2,3-C]azepine,
1-(3',4'-dihydroxyphenyl)-5-chloro-1,2,3,4-tetrahydrobenzothieno[2,3]azepine,
1-(3',4',5'-trimethoxy)-8-fluoro-1,2,3,4-tetrahydrobenzothieno[2,3-C]azepine, and
1-(3'-furyl)-6-hydroxy-1,2,3,4-tetrahydrobenzothieno[2,3-C]azepine.

The compounds which are represented by the formula

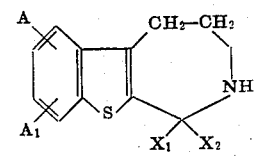

in which $X_1$ is other than hydrogen may be prepared by a variety of methods. The compounds in which $X_1$ is methyl may be prepared by treating an appropriate amine with a methyl ketone in the presence of a p-toluenesulfonic acid and toluene followed by treatment with an acid such as hydrogen chloride in an inert solvent such as ether. The described process may be illustrated as follows:

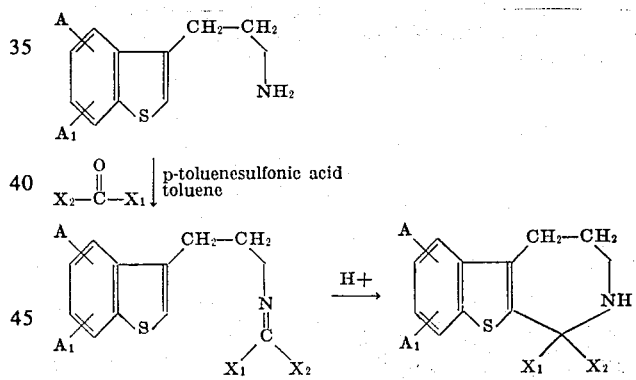

wherein $X_1$ is methyl and $A_1$ and $A_2$ are as described and represent groups that do not partake in or interfere with the reaction.

Representative of the ketones which may be employed in the described process are the following:
acetone,
methyl ethyl ketone,
3-pentanone,
2-pentanone, and
acetophenone.

Representative of the compounds which may be prepared by the described process are the following:
1-ethyl-1-methyl-1,2,3,4-tetrahydrobenzothieno[2,3-C]azepine,
1-methyl-1-phenyl-1,2,3,4-tetrahydro-5H-benzothieno[2,3-C]azepine, and
1,1-dimethyl-1,2,3,4-tetrahydro-5H-benzothieno[2,3-C]azepine.

The compounds in which $X_1$ is hydrogen and $X_2$ is alkyl or aralkyl may also be prepared by first treating the corresponding amine with a conventional acylating agent such as an acyl halide, anhydride or ester, in a suitable solvent such as benzene, toluene or xylene, preferably at reflux temperature to form the corresponding amide. The resulting amide is then treated with phosphorus pentoxide and phosphorus oxychloride in a suitable anhydrous medium such as xylene or toluene, to form the ring unsaturated 3,4-dihydrothianaphthieno[,3-C]azepine derivative which upon treatment with lithium aluminum hydride yields the desired ring saturated compound.

The above described process may be illustrated as follows:

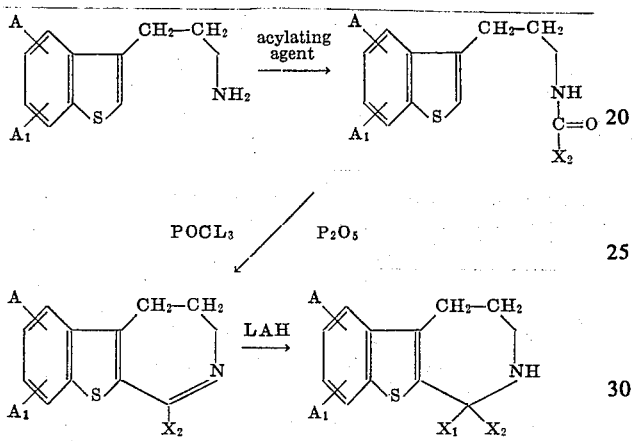

wherein A and $A_1$ are as described and represent groups that do not interfere with or partake in the reactions.

Representative of the acylating agents which may be employed are the following:
acetyl chloride,
acetyl bromide,
acryloyl chloride,
β-nitropropionyl chloride,
propionyl chloride,
propionyl iodide,
n-butyryl chloride,
benzoyl chloride,
acetic anhydride,
propionic anhydride,
ethyl formate,
benzyl formate,
γ-(N-methylpiperazino)butyryl chloride,
β-(N-methylpiperazino)propionyl chloride,
β-(morpholino)propionyl chloride,
β-[3-(N-methyl)pyrrolidyl]propionyl chloride, and
γ-(piperidyl)butyryl chloride.

Representative of some of the amides prepared by the process are the following:
N-acetyl-γ-(3-thianaphthenyl)propylamine,
N-3-nitropropionyl-γ-(3'-thianaphthenyl)propylamine,
N-(3,4-dimethoxyphenylacetyl)-γ-(3-thianaphthenyl)propylamine,
N-acryloyl-γ-(3-thianaphthenyl)propylamine,
N-propionyl-γ-(3-thianaphthenyl)propylamine,
N-(p-methoxyphenylacetyl)-γ-(3-thianaphthenyl)propylamine,
N-iso-butyryl-γ-(3-thianaphthenyl)propylamine,
N-butyryl-γ-(3-thianaphthenyl)propylamine,
N-[β-(N'-methylpiperazino)propionyl]-γ-(3-thianaphthenyl)propylamine,
N-methyl-N-[β-(diethylamino)propionyl]-γ-(5-chloro-3-thianaphthenyl)propylamine,
N-dimethylaminoacetyl-γ-(5-fluoro-3-thianaphthenyl)propylamine,
N-γ-(diethylamino)butyryl-γ-(5-hydroxy-3-thianaph-thenyl)propylamine, and
N-β-(N'-hydroxyethylpiperazino)propionyl-γ-(5-trifluoromethyl-3-thianaphthenyl)propylamine.

Representative of some of the 3,4-dihydro-5H-benzothieno[2,3-C]azepines and 1,2,3,4-tetrahydro-5H-benzothieno[2,3-C]azepines which may be prepared are the following:
1-iso-propyl-3,4-dihydro-5H-benzothieno[2,3-C]azepine,
1-(β-diethylaminoethyl)-6-hydroxy-3,4-dihydro-5H-benzothieno[2,3-C]azepine,
1-methyl-3,4-dihydro-5H-benzothieno[2,3-C]azepine,
1-(3',4'-dimethoxyphenyl)-3,4-dihydro-5H-benzothieno[2,3-C]azepine,
6-chloro-1-ethyl-3,4-dihydro-5H-benzothieno[2,3-C]azepine,
1-[4'-(N-methylpiperidyl)]-7-trifluoromethyl-3,4-dihydro-5H-benzothieno[2,3-C]azepine,
1-iso-propyl-1,2,3,4-tetrahydro-5H-benzothieno[2,3-C]azepine.
1-ethyl-1,2,3,4-tetrahydro-5H-benzothieno[2,3-C]azepine,
1-propyl-1,2,3,4-tetrahydro-5H-benzothieno[2,3-C]azepine,
1-methyl-1,2,3,4-tetrahydro-5H-benzothieno[2,3-C]azepine,
1-(3',4'-dimethoxyphenyl)-1,2,3,4-tetrahydro-5H-benzothieno[2,3-C]azepine,
7-chloro-1-ethyl-1,2,3,4-tetrahydro-5H-benzothieno[2,3-C]azepine,
1-[4'-(N-methylpiperidyl)]-7-trifluoromethyl-1,2,3,4-tetrahydrobenzothieno[2,3-C]azepine,
1-[β-(N-hydroxyethylpiperazino)ethyl]-7-methoxy-1,2,3,4-tetrahydrobenzothieno[2,3-C]azepine, and
7-hydroxy-1-(N-methylpiperazinoethyl)-1,2,3,4-tetrahydrobenzothieno[,3-C]azepine.

The compounds of the present invention in which R, $X_1$ and $X_2$ are hydrogen may be prepared by several methods. For example, they may be prepared by treating a corresponding amine with paraformaldehyde in an acetate buffer such as sodium acetate and acetic acid or reduction of the corresponding lactam.

The two processes may be diagrammed as follows:

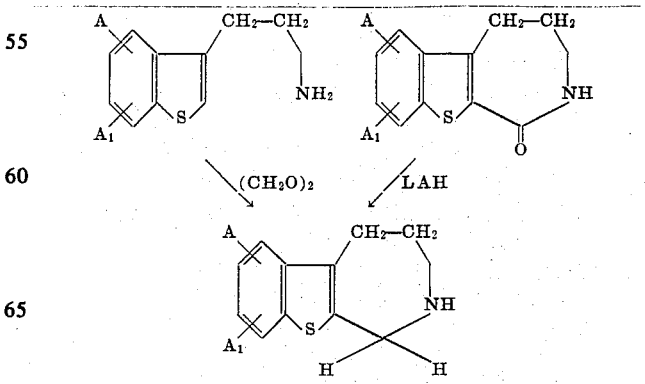

Representative of the compounds which may be prepared are the following:

The described processes may be illustrated as follows:

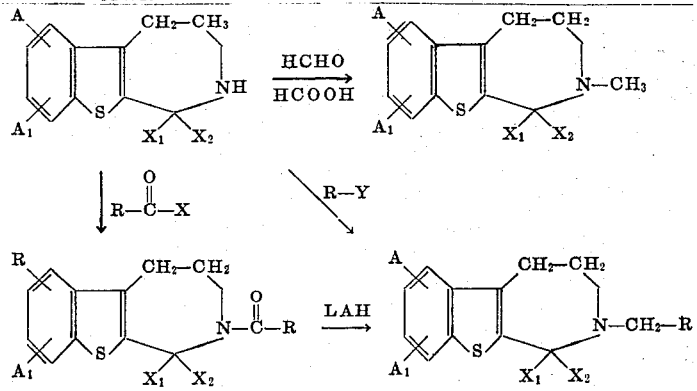

1,2,3,4-tetrahydro-5H-benzothieno[2,3-C]azepine,
6-chloro-1,2,3,4-tetrahydro-5H-benzothieno[2,3-C]azepine,
7-chloro-1,2,3,4-tetrahydro-5H-benzothieno[2,3-C]azepine,
8-chloro-1,2,3,4-tetrahydro-5H-benzothieno[2,3-C]azepine,
9-chloro-1,2,3,4-tetrahydro-5H-benzothieno[2,3-C]azepine,
6-fluoro-1,2,3,4-tetrahydro-5H-benzothieno[2,3-C]azepine,
7-fluoro-1,2,3,4-tetrahydro-5H-benzothieno[2,3-C]azepine,
8-fluoro-1,2,3,4-tetrahydro-5H-benzothieno[2,3-C]azepine,
9-fluoro-1,2,3,4-tetrahydro-5H-benzothieno[2,3-C]azepine,
6-trifluoromethyl-1,2,3,4-tetrahydro-5H-benzothieno[2,3-C]azepine,
7-trifluoromethyl-1,2,3,4-tetrahydro-5H-benzothieno[2,3-C]azepine,
8-trifluoromethyl-1,2,3,4-tetrahydro-5H-benzothieno[2,3-C]azepine,
9-trifluoromethyl-1,2,3,4-tetrahydro-5H-benzothieno[2,3-C]azepine,
7-bromo-1,2,3,4-tetrahydro-5H-benzothieno[2,3-C]azepine,
8-bromo-1,2,3,4-tetrahydro-5H-benzothieno[2,3-C]azepine,
7-hydroxy-1,2,3,4-tetrahydro-5H-benzothieno[2,3-C]azepine,
8-hydroxy-1,2,3,4-tetrahydro-5H-benzothieno[2,3-C]azepine,
7,8-dihydroxy-1,2,3,4-tetrahydro-5H-benzotheino[2,3-C]azepine,
7-methoxy-1,2,3,4-tetrahydro-5H-benzothieno[2,3-C]azepine,
8-methoxy-1,2,3,4-tetrahydro-5H-benzothieno[2,3-C]azepine, and
7,8-dimethoxy-1,2,3,4-tetrahydro-5H-benzothieno[2,3-C]azepine.

The compounds of the present invention in which R is lower alkyl may be prepared from the compounds in which R is hydrogen by a variety of conventional alkylation procedures. For example, the alkyl derivatives may be prepared by treating the unsubstituted compound with an alkyl halide or by treating it with an acyl halide, followed by reduction of the acyl derivative with an alkali metal hydride such as lithium aluminum hydride. The compounds in which R is methyl are most conveniently prepared by treating the unsubstituted compound with formaldehyde and formic acid.

wherein R-X is an alkylating agent such as an alkyl halide or a reactive ester and

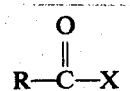

is an acyl halide.

Representative of the compounds which may be prepared by the described processes are the following:
1-ethyl-2-methyl-6-methoxy-1,2,3,4-tetrahydro-5H-benzothieno[2,3-C]azepine,
1-methyl-2-benzyl-7-chloro-1,2,3,4-tetrahydro-5H-benzothieno[2,3-C]azepine,
1-β-dimethylaminoethyl-2-ethyl-1,2,3,4-tetrahydro-5H-benzothieno[2,3-C]azepine,
1,1,2-trimethyl-8-fluoro-1,2,3,4-tetrahydro-5H-benzothieno[2,3-C]azepine,
1-methyl-2-ethyl-7-trifluoromethyl-1,2,3,4-tetrahydro-5H-benzothieno[2,3-C]azepine,
1-ethyl-2-methyl-6-chloro-1,2,3,4-tetrahydro-5H-benzothieno[2,3-C]azepine,
1,1,2-trimethyl-7-fluoro-1,2,3,4-tetrahydro-5H-benzothieno[2,3-C]azepine, and
1-ethyl-2-(p-chlorobenzyl)-7-hydroxy-1,2,3,4-tetrahydro-5H-benzothieno[2,3-C]azepine.

The compounds of the present invention which are represented by the formula

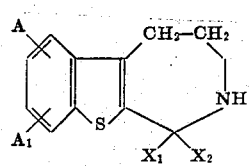

in which R is B—Am are conveniently prepared by first treating a corresponding unsubstituted compound with an aminoacyl halide to form the corresponding acyl amine derivative and then treating it with a chemical reducing agent such as LAH or other metal hydrides to form the amine derivative.

The described process may be illustrated as follows:

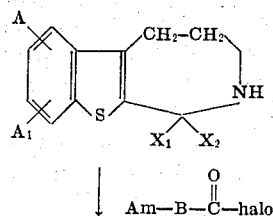

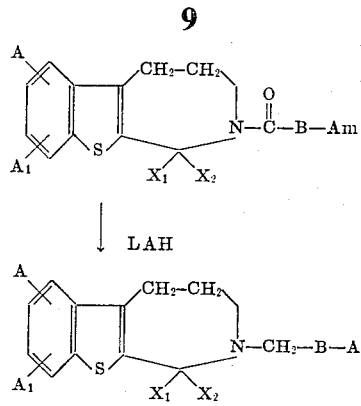

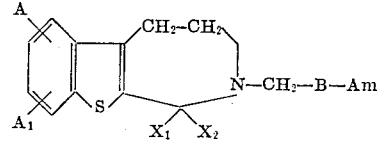

Wherein $X_1$, $X_2$, A and $A_1$ are as described and do not interfere with or partake in the reaction.

Representative of the aminoacylhalides which may be used in the above described process are the following:

3-(diethylamino)propionyl halide,
2-(dimethylamino)acetyl halide,
3-(N-benzyl-N-methylamino)propionyl bromide,
2-(N,N-dibenzylamino)acetyl halide,
3-(N-phenyl-N-methylamino)propionyl bromide,
γ-(N-methylpiperazino)butyryl chloride,
β-(N-methylpiperazino)propionyl chloride,
β-(morpholino)propionyl chloride,
β-[3-(N-methyl)pyrrolidyl]propionyl chloride, and
γ-(piperidyl)butyryl chloride.

Representative of the compounds which may be prepared in the described manner are the following:

2-β-diethylaminopropionyl-1-phenyl-1,2,3,4-tetrahydro-5H-benzothieno[2,3-C]azepine,
2-β-diethylaminopropionyl-1-methyl-1,2,3,4-tetrahydro-5H-benzothieno[2,3-C]azepine,
2-β-dimethylaminoacetyl-1-phenyl-1,2,3,4-tetrahydro-5H-benzothieno[2,3-C]azepine,
2-β-dimethylaminoacetyl-1-methyl-1,2,3,4-tetrahydro-5H-benzothieno[2,3-C]azepine,
1-ethyl-2-β-diethylaminopropionyl-6-chloro-1,2,3,4-tetrahydro-5H-benzothieno[2,3-C]azepine,
1-γ-dimethylaminopropyl-2-acetyl-7-methoxy-1,2,3,4-tetrahydro-5H-benzothieno[2,3-C]azepine,
2-γ-diethylaminopropyl-1-phenyl-1,2,3,4-tetrahydro-5H-benzothieno[2,3-C]azepine,
2-β-diethylaminopropyl-1-methyl-1,2,3,4-tetrahydro-5H-benzothieno[2,3-C]azepine,
2-β-dimethylaminoethyl-1-phenyl-1,2,3,4-tetrahydro-5H-benzothieno[2,3-C]azepine,
2-β-dimethylaminoethyl-1-methyl-1,2,3,4-tetrahydro-5H-benzothieno[2,3-C]azepine,
2-γ-diethylaminopropyl-7-chloro-1,2,3,4-tetrahydro-5H-benzothieno[2,3-C]azepine, and
2-γ-dimethylaminopropyl-7-trifluoromethyl-1,2,3,4-tetrahydro-5H-benzothieno[2,3-C]azepine.

The compounds in which R is B—Am may also be prepared by first treating the corresponding unsubstituted compound with an α,β unsaturated acyl halide, such as acrylic halide, followed by treatment with an amine and lithium aluminum hydride.

The described process may be illustrated as follows:

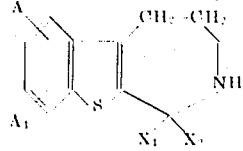

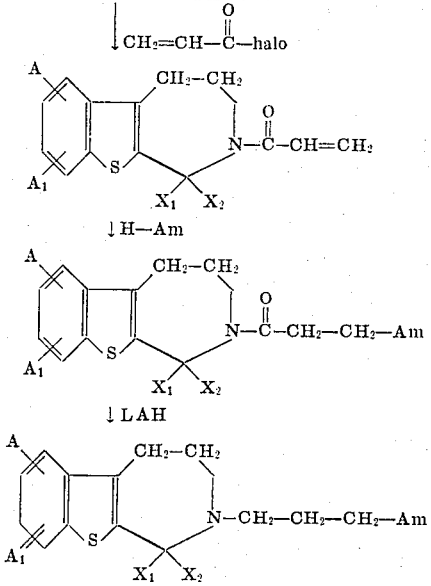

wherein $X_1$, $X_2$, A and $A_1$ are as described and do not partake in or interfere with the reaction.

The above described process provides a convenient means of preparing those compounds which might not be conveniently prepared by the use of aminoacylhalides because of their commercial unavailability.

Representative of the compounds which might be conveniently prepared by the described method are the following:

1-methyl-2-(γ-4'-methylpiperazinopropyl)-1-phenyl-1,2,3,4-tetrahydro-5H-benzothieno[2,3-C]azepine,
1-methyl-2-(γ-4'-methylpiperazinopropyl)-1-methyl-1,2,3,4-tetrahydro-5H-benzothieno[2,3-C]azepine,
2-(β-4'-methylpiperazinopropionyl)-1-phenyl-1,2,3,4-tetrahydro-5H-benzothieno[2,3-C]azepine,
2-(γ-4'-methylpiperazinopropyl)-1-phenyl-1,2,3,4-tetrahydro-5H-benzothieno[2,3-C]azepine,
1-ethyl-7-hydroxy-2-(β-diethylaminopropionyl)-1,2,3,4-tetrahydrobenzothieno[2,3-C]azepine,
1-(4'-pyridyl)-2-(β'-N-methylpiperazinopropionyl)-1,2,3,4-tetrahydrobenzothieno[2,3-C]azepine, and
1-[4'-(N'-methylpiperidyl)]-6-methoxy-2-propionyl-1,2,3,4-tetrahydrobenzothieno[2,3-C]azepine.

A variety of compounds in which R is other than amino may also be prepared by use of conventional techniques. For example, the compounds in which R is hydroxyethyl may be prepared by treating the corresponding 1-substituted compound with ethylene oxide. The described reactions may be illustrated as follows:

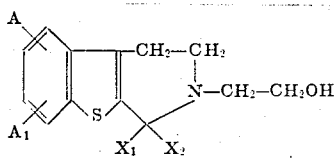

in which $X_1$, $X_2$, A and $A_1$ are as described and do not partake in or interfere with the reactions.

The novel compounds of the present invention may be used as intermediates in the preparation of more complex chemical and pharmaceutical compounds, and because of their antiserotonin activity are valuable pharmacological tools. In addition, they are useful as pharmaceutical agents, per se, because of their antipsychotic properties, especially their ability to control antisocial aggressive behavior when administered to animals. For example, the compound 1-phenyl-1,2,3,4-tetrahydrobenzothieno[2,3-C]azepine hydrochloride has shown at a safe and effective dose of approximately 20 mg/kg intraperi-toneally an ability to decrease or inhibit the antisocial behavioral characteristics such as aggressiveness, viciousness and persistence for fighting, induced by isolation in mice. The compound was also found to have $LD_{50}$'s in mice in excess of 75 mg/kg intraperitoneally in behavioral studies conducted in accordance with procedures outlined by Irwin in "Animal and Clinical Pharmacologic Techniques in Drug Evaluation," J. H. Nodine and P. E. Siegler, Ed., Year Book Publishers, Inc., 1964, pp. 36–54.

The following compounds were found to lower blood pressure when administered in 3.0 and 10.0 mg/kg intravenous doses to the vagotomized, anesthesized cat preparation, which is a standard animal preparation for testing for antihypertensive activity:

1-phenyl-1,2,3,4-tetrahydrobenzothieno[2,3-C]azepine hydrochloride, and
1-ethyl-1,2,3,4-tetrahydrobenzothieno[2,3-C]azepine hydrochloride.

The novel compounds in which R is B—Am are also useful as they form salts with penicillins which can be used to aid in the isolation and purification of the antibiotics.

Acid addition salts of the compounds of the present invention may be conveniently prepared by contacting the compounds which are capable of forming such salts with a suitable acid such as formic acid, citric acid, maleic acid, sulfuric acid, hydrochloric acid, succinic acid, tartaric acid, benzoic acid or fumaric acid.

Quaternary ammonium salts may be formed by contacting the salt forming compounds with a suitable alkylating agent such as dimethyl sulfate or an alkyl halide such as methyl chloride, methyl iodide or ethyl bromide.

When intended for use as pharmaceuticals, the compounds are preferably combined with a major amount of one or more suitable pharmaceutical diluents and formed into unit dosage forms. Such dosage forms provide suitable means for oral and parenteral administration.

The pharmaceutical diluents which may be employed may be either liquid or solid, but the preferred liquid carrier is water. In the event the compound is not soluble in water a pharmaceutically acceptable organic solvent such as propylene glycol may be employed.

Solid pharmaceutical diluents such as starch, sugar and talc can be utilized to form powders which can in turn be used as such or may be tableted or encapsulated. In addition to the forementioned material, a wide variety of conventional pharmaceutical lubricants, disintegrating agents, flavoring agents and the like, may also be employed.

The unit dosage forms may contain a concentration of 0.1 to 10 percent or more by weight of one or more of the novel compounds. Generally, such dosage forms will contain about 5 to 250 mg. of the active ingredients. One or more of such dosage forms may be administered daily. The usual intravenous dose will be equivalent to approximately 10 mg/kg of the patient's body weight.

The following examples are presented to illustrate this invention:

EXAMPLE 1

β-(3-Thianaphthenyl)propionamide

A mixture of 30 g. (0.145 mole) of 3-thianaphthenepropionic acid and 50 ml. (0.7 mole) of $SOCl_2$ is heated at 50°–67° for 1.5 hours and allowed to cool to 30° in 1.5 hours. It is concentrated in vacuo and the residue dissolved in 50 ml. of ether. It is added dropwise to 100 ml. of $NH_4OH$ solution at 5° in 0.5 hours. The mixture is heated until all ether has been removed, cooled and the solids collected and dried to yield β-(3-thianaphthenyl)propionamide as a white solid; m.p. 98°–100b$L$.

Anal. Calcd. for $C_{11}H_{11}NSO$: C, 64.37; H, 5.40; N, 6.82.

Found: C, 64.87; H, 5.45; N, 6.84.

EXAMPLE 2

γ-(3-Thianaphthenyl)propylamine Hydrochloride

To a dispersion of 13.4 g. (0.354 mole) of $LiAlH_4$ in 200 ml. of ether is added a dispersion of 24.2 g. (0.118 mole) of 3-thianaphthenepropionamide in 800 ml. of ether in 0.5 hours. The mixture is refluxed for 16 hours after which 200 ml. of benzene is added and refluxed again for 1.5 hours. The complex is decomposed with 60 ml. of water and the solid removed by filtration. The filtrate is dried ($Na_2SO_4$), and concentrated to yield a theoretical amount of an oil. A 3.0 g. portion of this material is dissolved in ether and acidified with ethereal HCl. The solids are collected and recrystallized twice from 2-propional to yield γ-(3-thianaphthenyl)propylamine hydrochloride as white crystals, m.p. 187°–189°.

Anal. Calcd. for $C_{11}H_{14}ClNS$: C, 58.00; H, 6.20; N, 6.16.

Found: C, 58.27; H, 6.30; N, 6.16.

EXAMPLE 3

N-Propionyl-γ-(3-thianaphthenyl)propylamine

To a solution of 9.1 g. (0.098 mole) of propionyl chloride in 150 ml. of benzene is added a solution of 15 g. (0.0784 mole) of γ-(3-thianaphthenyl)propylamine and 7.75 g. (0.098 mole) of pyridine in 0.5 hours at 10°. The mixture is stirred at 10° for 1 hour, at 25° for 17.5 hours, and refluxed for 1.5 hours. The mixture is cooled and 100 ml. of water added and stirred 5 minutes. The organic layer is separated and washed successively with 100 ml. 10 percent HCl solution and 50 ml. of brine. It is dried (Na₂SO₄) and concentrated to yield the theoretical amount of a yellow oil. A 5.0 g. portion is chromatographed through alumina using varying proportions of benzene/petroleum ether and ether/benzene to yield an oil which crystallizes on standing to yield a light yellow solid, m.p. 55°–57.5°.

Anal. Calcd. for $C_{14}H_{17}NSO$: C, 67.97; H, 6.92; N, 5.66; S, 12.95.

Found: C, 68.21; H, 6.92; N, 5.535; S, 13.08.

EXAMPLE 4

1-Ethyl-3,4-dihydro-5H-benzothieno[2,3-C]azepine Fumarate Ethanolate

A mixture of 10 g. (0.0404 mole) of N-(propionyl)-3-(β-aminopropyl)thianaphthene, 16.4 g. (1.15 moles) of $P_2O_5$ and 16.4 g. (1.06 moles) of $POCl_3$ in 250 ml. of xylene is refluxed for 2 hours. The mixture is cooled and 400 ml. of water added. The mixture is basified with NaOH flakes after which 200 ml. of $CHCl_3$ is added and stirred 15 minutes. The organic layer is separated, washed with brine, dried (Na₂SO₄) and concentrated to yield a brown oil which is chromatographed through alumina using benzene as the eluent to yield a yellow oil which crystallizes upon standing.

A portion of this material (2.5 g., 0.011 mole) is dissolved in 20 ml. of ethanol and added to a solution of 1.4 g. (0.012 mole) of fumaric acid in 25 ml. of ethanol, filtered and cooled. The solids are collected and dried to yield 1-ethyl-3,4-dihydro-5H-benzothieno[2,3-C]azepine fumarate ethanolate as a yellow solid, m.p. 158°–160°.

Anal. Calcd. for $C_{20}H_{25}NSO_5$: C, 61.40; H, 6.40; N, 3.58; S, 8.19.

Found: C, 61.45; H, 6.72; N, 3.60; S, 8.15.

EXAMPLE 5

1-Ethyl-1,2,3,4-tetrahydro-5H-benzothieno[2,3-C]azepine Hydrochloride

To a dispersion of 2.4 g. (0.63 mole) of $LiAlH_4$ in 100 ml. of tetrahydrofuran is added a solution of 3.6 g. (0.016 mole) of 1-ethyl-3,4-dihydro-5H-benzothieno[2,3-C]azepine in 100 ml. of tetrahydrofuran in 10 minutes after which it is refluxed for 8 hours. The complex is decomposed with 15 ml. of water and filtered. The filtrate is dried and concentrated to yield an oil which was chromatographed through $Al_2O_3$ using ether as an eluent to yield a crystalline solid which is dissolved in ether and acidified with ethereal HCl. The solids are collected and refluxed in 60 ml. of acetonitrile and cooled. The solids are collected and dried to yield 1-ethyl-1,2,3,4-tetrahydro-5H-benzothieno[2,3-C]azepine hydrochloride as a white powder, m.p. 238°–240°.

Anal. Calcd. for $C_{14}H_{18}ClNS$: C, 62.78; H, 6.78; N, 5.24.

Found: C, 62.97; H, 7.05; N, 5.04.

EXAMPLE 6

1-Phenyl-3,4-dihydro-5H-benzothieno[2,3-C]azepine

To a mixture of 24.8 g. (0.174 mole) of $P_2O_5$ and 24.8 g. (0.161 mole) of $POCl_3$ in 300 ml. of dry xylene is added 18.16 g. (0.0015 mole) of N-benzoyl-γ-(3-thionaphthenyl)propylamine after which the mixture is refluxed for 2 hrs. Water (700 ml.) is then added and the mixture heated on a steam bath for 0.5 hrs. The organic layer is separated and extracted with 200 ml. of water. The combined aqueous solution is cooled, filtered, and basified with pellet NaOH. It is extracted three times with 100 ml. portions of benzene. The combined extracts are washed with water, dried and concentrated to yield a clear oil which was chromatographed through alumina (150 g.) using varying proportions of $CHCl_3$ and benzene to yield 1-phenyl-3,4-dihydro-5H-benzothieno[2,3-C]azepine as a clear viscous oil.

Anal. Calcd. for $C_{18}H_{15}NS$: C, 77.94; H, 5.45; N, 5.05; S, 11.55.

Found: C, 77.65; H, 5.59; N, 5.32; S, 11.41.

EXAMPLE 7

1-Phenyl-1,2,3,4-tetrahydro-5H-benzothieno[2,3-C]azepine Hydrochloride

To a dispersion of 2.2 g. (0.0575 mole) of $LiAlH_4$ in 100 ml. of ether is added a solution of 4.0 g. (0.0144 mole) of 1-phenyl-3,4-dihydro-5H-benzothieno[2,3-C]azepine in 50 ml. of ether in 0.2 hrs. after which it is refluxed for 18 hrs. The complex is decomposed with 9 ml. of water and the solids removed by filtration. The filtrate is dried and acidified with ethereal/HCl. The solids are collected and recrystallized from ethanol/ether and again from acetonitrile/2-propanol to yield 1-phenyl-1,2,3,4-tetrahydro-5H-benzothieno[2,3-C]azepine hydrochloride as a white light textured solid in two crops, m.p. 239°–242°.

Anal. Calcd. for $C_{18}H_{18}ClNS$: S, 10.16.

Found: S, 10.24.

We claim:

1. A compound selected from compounds and pharmaceutically acceptable salts of compounds of the formula

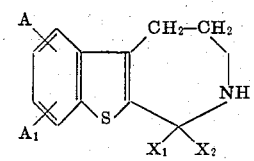

wherein A and $A_1$ are selected from hydrogen, hydroxy, nitro, lower alkyl, lower alkoxy, halo and trifluoromethyl, R is selected from hydrogen and $(CH_2)$n—OH in which $n$ is two to six, $X_1$ is hydrogen or lower alkyl and $X_2$ is selected from hydrogen, lower alkyl, phenyl, phenyl substituted by halo or lower alkoxy, phenyl-lower alkyl, and phenyl-lower alkyl wherein the phenyl group is substituted by halo or lower alkoxy.

2. A compound of claim 1 in which A, $A_1$, R, $X_1$ and $X_2$ are hydrogen.

3. A compound of claim 1 in which A, $A_1$, $X_1$ and R are hydrogen and $X_2$ is ethyl.

4. A compound of claim 1 in which A, $A_1$, $X_1$ and R are hydrogen and $X_2$ is phenyl.

* * * * *